United States Patent Office 3,346,389
Patented Oct. 10, 1967

3,346,389
CAKE MIX, BATTER, METHOD OF MAKING A CAKE AND THE RESULTING PRODUCT
James W. Evans, Highland, Ind., and Charles S. McWilliams, La Grange, Ill., assignors to American Maize-Products Company, a corporation of Maine
No Drawing. Filed June 26, 1964, Ser. No. 378,438
11 Claims. (Cl. 99—92)

ABSTRACT OF THE DISCLOSURE

Cake batters and finished cakes baked therefrom are substantially improved by adding from about 1% to about 5% by weight of pregelatinized starch having a natural amylose content below 18% by weight. Said pregelatinized starch is added to the cake batter and the proportion of added starch is based upon the weight of solid ingredients in said batter.

---

This invention relates to an improved cake batter mix and more particularly to the addition of defined forms of starch to such mixes in small but effective quantities to materially improve important characteristics of the finished baked cakes obtained from such mixes.

Pre-mixed, dry cake batter compositions, the so-called one-stage mixes to which the housewife adds one or more of milk, water or eggs, are currently popular and sold in large quantities. Since all finished baked cakes are systems which require a delicate balance between properties such as softness, texture, grain and tenderness, it is a relatively difficult matter to obtain cakes having the desirable balanced properties from such pre-mixed cake batter compositions on a reliable and consistent basis. Often the housewife in using these mixes experiences failure in obtaining, for example, adequate cake volume or good crumb texture or good crumb softness, and these shortcomings become more probable with the pre-packaged mixes which may be stored for relatively long periods before use and undergo undetectable changes leading to cakes of poor quality.

In studying this problem, we have noted that certain criteria can be set forth as governing to a large degree the quality of cakes which may be obtained from any particular batter mix composition. In general a one-stage batter mix must be capable of rapidly taking up water at high absorption levels so that the viscosity of the batter mix can be adequately increased. With a high viscosity the cake batter can entrap sufficient air during the mixing cycle with liquid components to provide a low specific gravity. A low specific gravity, in turn, will almost always yield finished baked cakes of adequate volume and good softness, texture and tenderness. Basically then, the desired properties in the batter mix system are rapid and high levels of hydration, high viscosity, and low specific gravity after the mixing cycle.

We have now discovered that the addition of small amounts of certain forms of starch to cake batter mixes surprisingly and unexpectedly improve the basic important properties of the batter mix as shown both by the pre-baked batter mix specific gravity as well as the substantially increased cake volumes obtained in the finished baked cakes. Moreover, we have found that in using these particular forms of starch, the finished baked cakes have extremely good crumb softness initially and can retain crumb softness over a storage period of six days. This fact is extremely important since the average family will not consume a cake on the same day that it is baked. Thus, the capability of a cake to retain a desirable level of softness is of prime concern to the average housewife.

In using certain forms of starch to improve cake batter mixes, we have noted that other forms of starch, while sometimes capable of improving one particular property in the batter mix system, can not on the overall basis duplicate the improved results which we obtained in using the defined forms of starch. Accordingly, we are not completely certain as to the way in which the defined forms of starch can so materially improve a cake batter mix, but our extensive studies have clearly demonstrated that the defined forms of starch can reliably and consistently give the improved results.

In accordance with the invention, we have found that the addition of small quantities of a pregelatinized starch which does not contain more than about 18% by weight of amylose leads to vastly superior cake batter mixes and to the finished baked cakes obtained therefrom. While any form of pregelatinized low amylose-containing starch can be used, we have further determined that it is highly desirable that the low amylose-containing starch be modified to further enhance its capability of improving the cake batters. More particularly, it is of great advantage that the pregelatinized low amylose-containing starch be modified by mild treatment with a cross-linking agent. When the starch has been so treated, usually one or more of its effects in the batter mix system, such as hydration speed, quantity of absorbed water, extent of decreasing the specific gravity or the extent of increase in cake volume or the capacity to retain crumb softness in the finished baked cake is greatly improved. Thus, for the purposes of our invention, the pregelatinized low amylose-containing starch should, for best results, be treated with a cross-linking agent before it is incorporated in a cake batter mix.

Various low amylose-containing starches may be incorporated in cake batter mixes in accordance with the invention. For example, waxy maize starches or waxy sorghum starches, which are considered to contain at most trace amounts of amylose, can be used with excellent results. Other forms of known starches which contain not more than 18% by weight of amylose can also be used and various derivatives of such starches, for example, starch ethers and esters may also be employed.

The starch must be pregelatinized before addition to a cake batter mix. Pregelatinization is carried out in conventional manner by heating the starch in the presence of excess water until the starch granules have broken and then the starch is dried upon drum rollers or any other form of conventional drying apparatus.

As previously mentioned, modification of the pregelatinized low amylose-containing starch by treatment with a cross-linking agent leads to superior results. In cross-linking the starch, only a slight degree of modification is required and therefore the starch may be reacted with anywhere from 0.01% to 0.1% of a cross-linking agent. The cross-linking agent is a polyfunctional material and suitably may be an aliphatic dihalide, such as propylene dichloride, ethylene dibromide, glycerol dichlorohydrin and dichlorobutane, epoxy halogen compounds such as epichlorohydrin and epibromohydrin, polyfunctional reagents such as phosphorous oxychloride, cyanuric chloride and alkali metal polymetaphosphate. These cross-linking reagents are reacted with the low amylose-containing starches to modify and mildly inhibit the starch in conventional manner.

The amount of starch required in the batter mix is quite small and, in general, may be anywhere from about 1% to about 5% by weight of the low amylose-containing starch. Less than about 1.0% of the starch does not give significant improvement in the properties of the batter mix, whereas more than about 5% by weight will usually detract from the quality of the finished baked cake even though some improvement may be achieved in one or two specific properties. In most cases, from 2% to about 3½% by weight of the low amylose-containing starch will give excellent results and these amounts are therefore preferred.

The most significant benefits of the invention are achieved by adding the pregelatinized low amylose-containing starch to dry pre-packaged batter mixes to which one or more of milk, water or eggs is added to prepare the batter for baking. However, the improved properties of the batter mix and the finished baked cakes are also obtained when the pregelatinized low amylose-containing starch is added to freshly prepared batter mix, such as in commercial bakeries or otherwise, and these improved fresh batter mixes are therefore also within the scope of the invention.

Further details of the invention can be understood by reference to the following examples in which all proportions are by weight unless otherwise stated.

A number of pregelatinized low amylose-containing starches were incorporated in several different cake batter mixes to evaluate their capability to improve several important properties of the batter mix and of cakes baked therefrom. These batter mixes were prepared by first blending all dry ingredients together in a pre-packaged dry-type of batter mix and thereafter water and eggs were uniformly mixed in to prepare a batter for baking.

Three different cake batter mix formulas were used representing respectively a one-stage white layer cake batter mix, a one-stage yellow layer cake batter mix and a one-stage devil's food layer cake batter mix. The formulas for each of these layer cakes were prepared as master blends as follows:

White layer cake master blend

| Ingredient: | Amount, percent |
|---|---|
| Cake flour | 39.51 |
| Powdered sugar | 10.20 |
| Fine granulated sugar | 29.90 |
| Dextrose hydrate | 3.06 |
| Flour salt | 1.00 |
| Sodium bicarbonate | 1.02 |
| Sodium aluminum phosphate | 1.02 |
| Nonfat milk solids | 3.58 |
| Imitation vanilla flavoring | 0.51 |
| Emulsified shortening | 10.20 |
| | 100.00 |

Yellow layer cake master blend

| Ingredient: | Amount, percent |
|---|---|
| Cake flour | 41.84 |
| Powdered sugar | 10.21 |
| Corn syrup solids | 1.53 |
| Fine granulated sugar | 30.90 |
| Flour salt | 1.02 |
| Nonfat milk solids | 2.04 |
| Sodium bicarbonate | 0.92 |
| Sodium aluminum phosphate | 0.82 |
| Yellow coloring | 0.26 |
| Imitation vanilla flavoring | 0.26 |
| Emulsified shortening | 10.20 |
| | 100.00 |

Devil's food layer cake master blend

| Ingredient: | Amount, percent |
|---|---|
| Cake flour | 36.47 |
| Powdered sugar | 10.20 |
| Fine granulated sugar | 28.31 |
| Corn syrup solids | 2.04 |
| Flour salt | 1.02 |
| Cultured buttermilk solids | 0.26 |
| Nonfat milk solids | 2.04 |
| Sodium bicarbonate | 1.29 |
| Sodium acid pyrophosphate | 1.02 |
| Cocoa | 6.13 |
| Imitation vanilla flavoring | 1.02 |
| Emulsified shortening | 10.20 |
| | 100.00 |

Various pregelatinized starches containing less than 18% by weight of amylose were added in weight concentrations of 0.0%, 1.0%, 2.0%, 2.5%, 3.0% and 5.0% to the above master blend mixes and cakes were baked from the batter prepared at each of these concentrations for each of the starches that were tested. The batters which contained no starch (0.0%) were baked into cakes to serve as controls for comparison purposes.

The various starches tested were uniformly mixed into each of the master blend batter mixes and then the dry batter mix was blended with water and eggs to form a cake batter for baking. In the case of the white layer cake master blend, the dry batter mix with added starch was mixed with water and egg whites in the proportions of 525.4 grams of dry batter mix, 320 grams of water and 68.0 grams of egg whites. In the case of the yellow and devil's food layer cake master blend mixes, the dry batter mixes with added starch were mixed with water and eggs in the proportions of 525.4 grams of dry batter mix, 320 grams water and two whole eggs (100 grams).

After the liquid components were uniformly mixed into each cake batter, the specific gravity of the batter was noted and recorded just before baking. Thereafter, each batter mix was baked for 25 minutes in an electric oven maintained at 350° F. Upon removal from the oven, each cake was allowed to cool for five minutes in the cake pan and then the cake was removed from the pan and placed upon screens to cool to room temperature.

Twenty-four hours after each cake had cooled to room temperature, the cake height was determined and recorded. In measuring the cake height, the cake was cut in half with a sharp, slightly dampened knife and the two halves then placed bottom to bottom. Measurements were then taken from one top crust to the opposite top crust at opposite edges, at the exact center and at the two midpoints between the opposite edges and the center. The five measurements were then averaged and reported as cake height. Since the diameter of all cake pans used in baking was the same, the cake heights were a direct measure of the cake volumes.

Each cake was also scored for crumb softness over a six day storage period. The cake was scored six times every twenty-four hours during the storage period and given a numerical rating for the degree of crumb softness in accordance with the following scale:

| Softness: | Rating |
|---|---|
| Extremely soft | 96 to 100 |
| Very, very soft | 91 to 95 |
| Very soft | 86 to 90 |
| Soft | 81 to 85 |
| Slightly soft | 76 to 80 |
| Slightly firm | 71 to 75 |
| Firm | 66 to 70 |
| Very firm | 61 to 65 |
| Very, very firm | 51 to 60 |
| Extremely firm | 41 to 50 |
| Poor | 30 to 40 |
| Unsatisfactory | 0 to 29 |

As will be noted in the softness rating scale, the best softness was assigned the rating of 100 and the worst a zero rating, with the intermediate ratings being as indicated.

EXAMPLE 1

In this example, the low amylose-containing starch used was a waxy maize starch which was pre-gelatinized and cross-linked with 0.05% by weight of phosphorous oxychloride. The starch was incorporated in the white layer cake master blend to form batters which were baked into finished cakes, all as previously described.

In the table below, the specific gravity of the batters, the % increase in cake height at each starch concentration and on the average, and the average softness rating over 6 days of storage are given in comparison to the control white layer cake master blend which contained no starch and yielded a cake 57 mm. in height.

| Physical Characteristic | Percent by weight of starch in cake batter | | | | | |
|---|---|---|---|---|---|---|
| | 0.0% | 1.0% | 2.0% | 2.5% | 3.0% | 5.0% |
| a. Batter specific gravity | 1.04 | 0.90 | 0.82 | 0.76 | 0.72 | 0.76 |
| b. Percent increase cake height over control | | 17.5 | 24.6 | 30.5 | 36.9 | 43.8 |
| c. Avg. percent increase, cake height | | 30.6 | | | | |
| d. Avg. softness rating over 6 days storage after baking | 30 | 87 | 96 | 95 | 94 | 47 |

As will be noted, there was a substantial improvement in all of the physical characteristics reported over the entire range of added starch concentrations.

EXAMPLE 2

Example 1 was repeated except that a pregelatinized waxy maize starch which was cross-linked with 0.05% by weight of epichlorohydrin was used as the low amylose-containing starch, this time in the devel's food layer cake master blend which, without added starch, yielded a cake 72 mm. in height. The results of these tests are given in the following table:

| Physical Characteristic | Percent by weight of starch in cake batter | | | | | |
|---|---|---|---|---|---|---|
| | 0.0% | 1.0% | 2.0% | 2.5% | 3.0% | 5.0% |
| a. Batter specific gravity | 0.92 | 0.93 | 0.88 | 0.85 | 0.80 | 0.87 |
| b. Percent increase cake height over control | | 8.3 | 15.3 | 22.2 | 26.4 | 19.5 |
| c. Avg. percent increase, cake height | | 18.3 | | | | |
| d. Avg. softness rating over 6 days storage after baking | 38 | 74 | 81 | 89 | 88 | 61 |

Again, it is evident that substantial improvement was achieved in the devil's food batters and finished cakes over the entire range of concentrations of added starch.

EXAMPLE 3

Example 1 was repeated, using the yellow layer cake master blend with various amounts of added waxy maize starch which, in this case, was pregelatinized and cross-linked with 0.04% by weight of phosphorous oxychloride. The yellow layer cake master blend, without any added starch, yielded a finished cake 63 mm. in height. The results are given below:

| Physical Characteristic | Percent by weight of starch in cake batter | | | | | |
|---|---|---|---|---|---|---|
| | 0.0% | 1.0% | 2.0% | 2.5% | 3.0% | 5.0% |
| a. Batter specific gravity | 1.00 | 0.87 | 0.82 | 0.78 | 0.72 | 0.84 |
| b. Percent increase cake height over control | | 7.9 | 20.6 | 30.2 | 44.4 | 33.4 |
| c. Avg. percent increase, cake height | | 27.3 | | | | |
| d. Avg. softness rating over 6 days storage after baking | 34 | 85 | 85 | 83 | 89 | 32 |

Once again, the low amylose-containing starch used was surprisingly effective in giving substantial improvement in important characteristics of the batters and cakes in which it was incorporated.

EXAMPLE 4

In this example, a waxy maize starch which was pregelatinized but not cross-linked was evaluated at 5.0% weight concentration in each of the white, yellow and devil's food layer cake master blends in the manner described in the previous examples. The cake heights obtained by baking the three master blends alone were, respectively, 57 mm., 63 mm. and 72 mm. as previously noted and the results of the tests of this example are given below:

| Physical Characteristic | Percent by weight of starch in batter | | | | | |
|---|---|---|---|---|---|---|
| | White Layer | | Yellow Layer | | Devil's Food Layer | |
| | 0.0% | 5.0% | 0.0% | 5.0% | 0.0% | 5.0% |
| a. Batter specific gravity | 1.04 | 0.86 | 1.00 | 0.75 | 0.92 | 0.75 |
| b. Percent increase cake height over control | | 12.3 | | 31.8 | | 25.0 |
| c. Avg. softness rating over 6 days storage after baking | 30 | 78 | 34 | 78 | 38 | 81 |

As can be seen, the low amylose-containing starch which was added gave definite and substantial improvements in the three different types of batters and corresponding finished cakes.

From the foregoing, it will be seen that starches which contain less than 18% by weight of amylose are extremely effective, for reasons not well understood, in the capacity to reduce the batter specific gravity, to increase the cake height and to retain high crumb softness over a six day storage period. This illustrates the great improvements which may be obtained in all forms of cake batters where a small amount of defined starch is added thereto in accordance with our invention.

It will be understood that it is intended to cover all changes and modifications of the preferred embodiments of the invention herein chosen for the purpose of illustration wihch do not constitute departures from the spirit and scope of the invention.

We claim:

1. In a cake batter composed principally of flour, sugar and shortening, the improvement which comprises from about 1% to about 5% by weight of added pregelatinized starch which contains not more than about 18% by weight of amylose, said proportion of added pregelatinized starch being based upon the weight of solid ingredients in said batter.

2. The improvement as in claim 1 wherein said starch is mildly cross-linked with from about 0.01% to about 0.1% by weight of a polyfunctional cross-linking reagent selected from the group consisting of aliphatic dihalides, epoxy halogen compounds, cyanuric chloride, phosphorous oxychloride and polymetaphosphates.

3. The improvement as in claim 1 wherein said starch is waxy maize starch.

4. The improvement as in claim 1 wherein said starch is waxy sorghum starch.

5. The improvement as in claim 1 wherein the amount of said starch is from about 2% to about 3.5% by weight.

6. In a pre-packaged dry cake batter mix composed principally of flour, sugar and shortening, the improvement which comprises from about 1% to about 5% by weight of added pregelatinized starch which contains not more than about 18% by weight of amylose, said proportion of added pregelatinized starch being based upon the weight of solid ingredients in said mix.

7. The improvement as in claim 6 wherein said starch is cross-linked with from about 0.01% to about 0.1% by weight of a polyfunctional cross-linking reagent selected from the group consisting of aliphatic dihalides, epoxy halogen compounds, cyanuric chloride, phosphorous oxychloride and polymetaphosphates.

8. An improved method of cake baking which comprises preparing a cake batter of principally flour, sugar and shortening and adding thereto from about 1% to about 5% of a pregelatinized starch which contains not more than 18% by weight of amylose, and then baking said batter at elevated temperature to obtain an improved cake, said proportion of added pregelatinized starch being based upon the weight of solid ingredients in said batter.

9. A method as in claim 8 wherein said starch is cross-linked with from about 0.01% to about 0.1% by weight of a polyfunctional cross-linking reagent selected from the group consisting of aliphatic dihalides, epoxy halogen compounds, cyanuric chloride, phosphorous oxychloride and polymetaphosphates.

10. A cake produced in accordance with the method set forth in claim 8.

11. A cake produced in accordance with the method set forth in claim 9.

References Cited

UNITED STATES PATENTS

| | | | |
|---|---|---|---|
| 2,919,986 | 1/1960 | Johnson | 99—94 |
| 2,982,662 | 5/1961 | Cochran et al. | 99—192 |
| 3,043,700 | 7/1962 | Szczesniak | 99—92 |
| 3,052,545 | 9/1962 | Ducharne et al. | 99—94 X |
| 3,235,385 | 2/1966 | Cull | 99—94 X |
| 3,268,337 | 8/1966 | Howard et al. | 99—92 |

OTHER REFERENCES

Matz: "The Chemistry and Technology of Cereals as Food and Feed," The Avi Publishing Co., Inc., 1959, Conn. TX 545 M 36 C. 2 (pp. 584–585 relied upon).

RAYMOND N. JONES, *Primary Examiner.*